Feb. 6, 1923.

E. A. SCHRADER.
COMBINATION BAKING APPARATUS FOR DENTAL MOLDS.
FILED APR. 3, 1922.

1,444,708.

2 SHEETS—SHEET 1.

Inventor,
E. A. Schrader, by
Attorney.

Feb. 6, 1923.
E. A. SCHRADER.
COMBINATION BAKING APPARATUS FOR DENTAL MOLDS.
FILED APR. 3, 1922.
1,444,708.
2 SHEETS—SHEET 2.
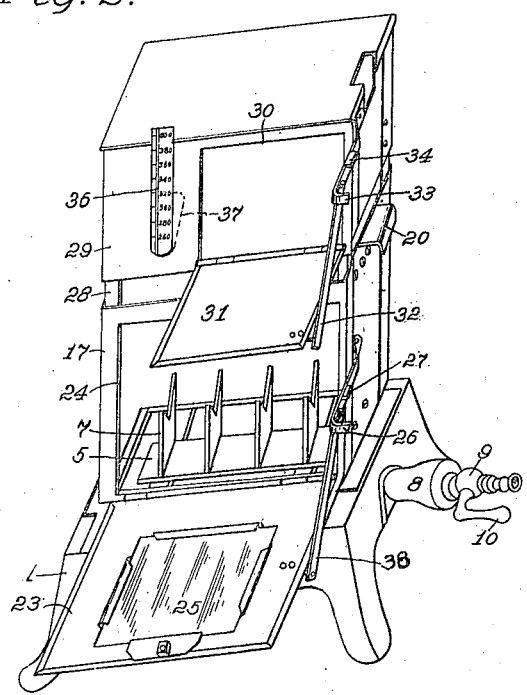
Fig. 2.
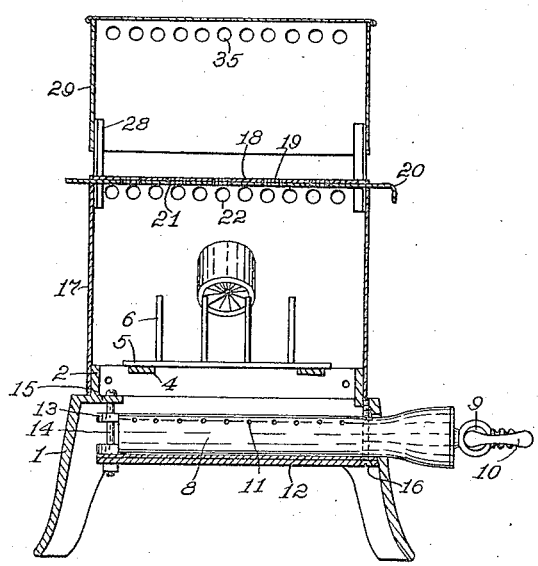
Fig. 4.
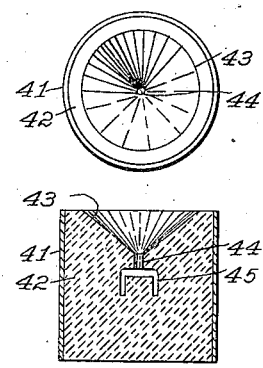
Fig. 5.
Fig. 6.
Inventor,
E. A. Schrader, by
G. C. Kennedy,
Attorney.

Patented Feb. 6, 1923.

1,444,708

UNITED STATES PATENT OFFICE.

ELMER A. SCHRADER, OF INDEPENDENCE, IOWA.

COMBINATION BAKING APPARATUS FOR DENTAL MOLDS.

Application filed April 3, 1922. Serial No. 549,159.

*To all whom it may concern:*

Be it known that I, ELMER A. SCHRADER, a citizen of the United States of America, and a resident of Independence, Buchanan County, Iowa, have invented certain new and useful Improvements in Combination Baking Apparatus for Dental Molds, of which the following is a specification.

My invention relates to improvements in combination baking apparatus for dental molds, and the object of my improvement is to supply to dental operators a baking means, which includes differentially heated ovens for graduated or different heat treatments of plaster dental molds, to properly cure or dry out the same without disintegration, while expelling the meltable patterns from the molds.

Figure 1:
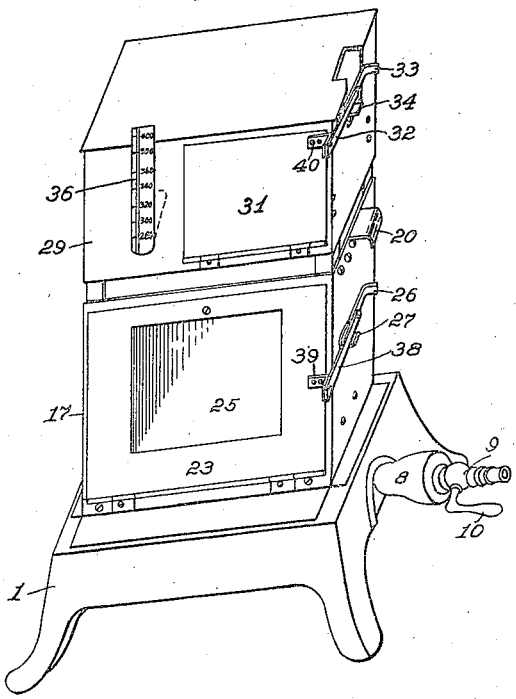
Figure 3:
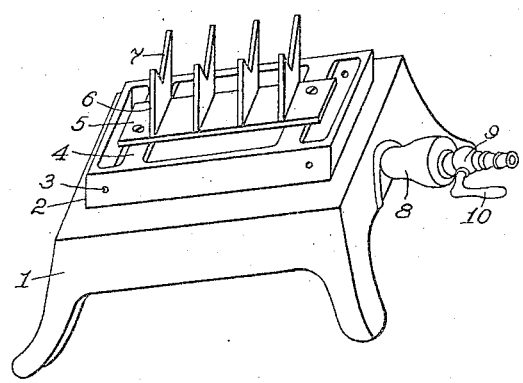

This object has been accomplished by the means which are hereinafter described and claimed, and which are illustrated in the accompanying drawings, in which Figs. 1 and 2 are perspective elevations with the swinging closures respectively closed and opened. Fig. 3 is a perspective detail view of the base and mold-rack with the ovens removed. Fig. 4 is a vertical transverse section of the apparatus showing a dental mold supported upon the rack within the lower oven. Fig. 5 is a top plan, and Fig. 6 is a central vertical cross section of a mold of the character mentioned.

Dental molds for the casting of tooth fillings, crowns and the like, are often constructed as shown in Figs. 5 and 6 wherein an open ended tubular housing 41 has a filling of plaster Paris 42, this filling having initially been mounted around a wax pattern which, when removed or melted, will leave a mold cavity 45 of the desired configuration, and having a riser 44 leading upwardly into a relatively large conical or dished gate 43.

As is well known in the art, the plaster mold of this kind must be subjected to heat treatment such as will effectually remove the water content thereof without such an excess of heating as may, after entire removal of the water, calcine or reduce the plaster to a disintegrated state. I have found by experiment and by the use of my improved baking apparatus that such a mold may be subjected to a differential heat treatment which will thoroughly expel the water content without disintegration and with a large saving of time in the process.

With this end in view, I provide an apparatus having spaced superposed ovens 17 and 29 connected by short standards 28, the upper oven being closed but having a door opening 30 with a downwardly swinging closure 31. The lower oven 17 has a closed top and its open bottom fits over and is secured to an oblong ledge 2 which projects upwardly from a legged base 1. The oven 17 has a large door opening 24 and a downwardly swinging closure 23 therefor which may be supplied with a transparent window 25.

A saddle 12 is dependingly supported on parts of said base as at 15 by a bolt 14 passed through lugs 13 on an intermediately positioned closed end burner tube 8 having burner orifices 11 and by means of screws 16 at the other end of the base. Said burner tube is thus supported on said saddle and has an enlarged end projecting from said base in communication with the valve-chamber 9 containing a plug-valve operated by a handle 10, said chamber having a nipple which may receive a tube not shown in communication with a supply of gaseous fuel. By means of the valve in said chamber, the flow of gas through the burner may be regulated or turned off.

On cross-bars 4 of the rectangular flange 2 a plate 5 is fastened, said plate having a number of transverse rack-standards 6 spaced apart longitudinally and having angular notches in their tops at 7. This rack is positioned in the lower part of the lower oven 17. The ovens 29 and 17 are supplied with ventilating openings 35 and 22 respectively. While the top of the lower oven 17 may be imperforate, it is desirable that this top 18 be supplied with an alined row of circular openings 19 and a damper 20 slidably mounted below said top and having like spaced openings 21 for adjustable communication with the openings 19 to permit of varying the amount of heat conducted to the upper oven.

The closures 31 and 23 are operated by means of like linking connections in which swinging arms 33 and 26 respectively are alike and mounted upon said upper and lower oven, said arms being connected by like pivoted links 32 and 38 respectively to the closures 31 and 28. Swinging of the arms 33 and 26 to and fro opens and closes the closures 31 and 28, while, when closed, stops 34 and 27 on the arms limit movement in one direction of the said links.

The numeral 36 denotes a thermometer whose indicating part is positioned without the oven 29 with its bulb 37 extending angularly into the oven.

A mold 42 containing a wax pattern as above described, may be placed within the lower oven 17 and supported in an inclined position upon a pair of the rack standards 6 with the riser 44 directed downwardly. The oven being closed, the flames from the burner openings 11 ascend and are baffled by the plate 5 so that they do not directly impinge upon said mold but the heated currents are thereby disseminated equally around it to insure equality in the baking operation. The intenser heat produced thereby in the lower oven, several hundred degrees Fahrenheit, quickly bakes and expels most of the moisture from the plaster of the mold while melting the wax pattern which escapes downwardly. This operation requires but a few minutes, instead of several hours with careful watching as usual. When the mold has been subjected to this intense heat for this short period, the operator removes it and immediately places it within the upper oven 29 for further baking of a few minutes. It has been experimentally demonstrated that the mold should not be subjected too long to the intenser heat of the lower oven as all the moisture will be expelled and the plaster become disintegrated. The heat treatment of the mold in the upper, lower temperature oven finishes the expelling of the moisture without terminal disintegration when all the moisture has been expelled. The critical temperature of the upper oven is about 380 degrees F. which, in the final baking, causes the mold after expulsion of the moisture, to be in a hardened state for proper casting purposes.

The above process is effective because too intense long continued heating of the mold might too rapidly change moisture therein into steam resulting in breaking or disintegration. It will also be understood that the proper temperature of the lower oven may be readily ascertained by consulting the thermometer 36 for when the indicated temperature of the upper oven is about 380 degrees F. this demonstrates that the temperature of the lower oven is right for the initial part of the baking process. The heat in the upper oven may be varied by regulating the introduction of gas to the burner or by adjusting the position of the damper 20.

Slight variations in the embodiment of this apparatus will nevertheless be covered by the scope of the invention and of its protection.

Having described my invention, what I claim as new and desire to secure by Letters Patent, is:

1. In combination, superposed and spaced ovens, heating-means for the lowermost oven, a rack positioned within the lowermost oven, and a temperature indicating device extending into the uppermost oven.

2. In combination, superposed ovens, heating-means in communication with the lowermost oven, means for adjustably varying the amount of heat conducted from the lowermost to the uppermost oven, and a temperature indicating device extending into the uppermost oven.

3. In combination, superposed ovens, an adjustable burner below and in communication with the interior of the lowermost oven, a flame-baffling rack positioned within said lowermost oven, a damper in the top of the lowermost oven, and a temperature indicating device extending into the uppermost oven.

4. In combination, superposed ovens each having a door-opening and a swinging closure therefor, operative interlocking linking-connections between said closures and said ovens respectively to hold them in open or closed positions, heating-means for the lower oven, and means for varying the temperature of the upper oven.

Signed at Waterloo, Iowa, this 20th day of March, 1922.

ELMER A. SCHRADER.